(12) United States Patent
Penkwitt et al.

(10) Patent No.: US 9,827,704 B2
(45) Date of Patent: Nov. 28, 2017

(54) EXTRUDER UNIT AND DRYER EQUIPPED THEREWITH

(71) Applicant: Huber SE, Berching (DE)

(72) Inventors: Sven Penkwitt, Langelsheim (DE); Karl-Heinz Bechtl, Hilpoltstein (DE)

(73) Assignee: HUBER SE, Berching (DE)

( * ) Notice: Subject to any disclaimer, the term of this patent is extended or adjusted under 35 U.S.C. 154(b) by 83 days.

(21) Appl. No.: 14/427,161

(22) PCT Filed: Sep. 5, 2013

(86) PCT No.: PCT/EP2013/068330
§ 371 (c)(1),
(2) Date: Mar. 10, 2015

(87) PCT Pub. No.: WO2014/037424
PCT Pub. Date: Mar. 13, 2014

(65) Prior Publication Data
US 2015/0239164 A1    Aug. 27, 2015

(30) Foreign Application Priority Data

Sep. 10, 2012 (DE) .................. 10 2012 108 404

(51) Int. Cl.
*B01J 2/20*     (2006.01)
*B29C 47/12*    (2006.01)
(Continued)

(52) U.S. Cl.
CPC ............ *B29C 47/0061* (2013.01); *B01J 2/20* (2013.01); *B29C 47/0803* (2013.01);
(Continued)

(58) Field of Classification Search
CPC ............ B29C 47/0014; B29C 47/0803; B29C 47/0883; B29C 47/122; B29C 47/30;
(Continued)

(56) References Cited

U.S. PATENT DOCUMENTS 2,241,546 A * 5/1941 Evenstad et al. ......... B29B 9/06
                                                        100/907
3,063,361 A * 11/1962 Gehrke ................. B30B 11/227
                                                        100/139
(Continued)

FOREIGN PATENT DOCUMENTS

DE       34 33 018       3/1986
DE       197 56 086      6/1999
(Continued)

OTHER PUBLICATIONS

German Search Report, dated May 12, 2013.
PCT Search Report, dated Feb. 4, 2014.
PCT IPRP, dated Mar. 10, 2015.

*Primary Examiner* — Yogendra Gupta
*Assistant Examiner* — Joseph Leyson
(74) *Attorney, Agent, or Firm* — Dority & Manning, P.A.

(57) ABSTRACT

The invention relates to an extrude unit for a dryer (2) for biomass, in particular slurry, wherein the extruder unit (1) has a surface section (4) for the biomass to pass through and a plurality of apertures (3), wherein the extruder unit (1) comprises a base support (5) which is connected by means of a connecting section (6) to a driving element (7) and can be driven by means of the driving element (7) about an axis of rotation (8) and relative to the surface section (4), wherein the base support (5) comprises at least one support arm (9) having at least one scraper blade (10) which during a rotation of the base support (5) follows the shape of the face of the surface section (4) facing the scraper blade (10). According to the invention the base support (5) also comprises at least one breaker element (11) having at least one scraper blade (10) which during a rotation of the base support (5) also follows the shape of the face of the surface section (4) facing the scraper blade (10) and during the rotation of the base support (5) effects a crushing of con- (Continued)

stituents contained in the biomass which are retained by the surface section (4). The invention further relates to a dryer having at least one corresponding extruder unit.

12 Claims, 5 Drawing Sheets

(51) Int. Cl.
*B29C 47/30* (2006.01)
*B30B 11/28* (2006.01)
*B29C 47/00* (2006.01)
*B29C 47/08* (2006.01)
*B29C 47/52* (2006.01)
*B30B 11/22* (2006.01)
*C02F 11/12* (2006.01)
*F26B 1/00* (2006.01)
*F26B 17/04* (2006.01)
*B29C 47/92* (2006.01)

(52) U.S. Cl.
CPC ........ *B29C 47/0883* (2013.01); *B29C 47/122* (2013.01); *B29C 47/30* (2013.01); *B29C 47/52* (2013.01); *B29C 47/522* (2013.01); *B30B 11/228* (2013.01); *C02F 11/123* (2013.01); *F26B 1/005* (2013.01); *B29C 47/92* (2013.01); *F26B 17/04* (2013.01); *F26B 2200/02* (2013.01); *F26B 2200/18* (2013.01)

(58) Field of Classification Search
CPC .......... B29C 47/52; B29C 47/522; B01J 2/20; B30B 11/228; F26B 2200/02
See application file for complete search history.

(56) References Cited

U.S. PATENT DOCUMENTS

| | | | | |
|---|---|---|---|---|
| 3,536,115 | A | * | 10/1970 | Weiler .................. A23N 17/02 241/82.5 |
| 6,123,858 | A | | 9/2000 | Manz |
| 2004/0182953 | A1 | | 9/2004 | Knoer |

FOREIGN PATENT DOCUMENTS

| | | |
|---|---|---|
| EP | 0 303 755 | 2/1989 |
| EP | 1 319 632 | 6/2003 |
| FR | 2 444 495 | 7/1980 |
| KR | 2002 0069606 | 9/2002 |
| WO | WO 03/050046 | 6/2003 |

* cited by examiner

US 9,827,704 B2

EXTRUDER UNIT AND DRYER EQUIPPED THEREWITH

CROSS-REFERENCE TO RELATED APPLICATIONS

This application is a national stage application of PCT/EP2013/068330, filed on Sep. 5, 2013, which claims priority to German application 10 2012 108 404.1, filed on Sep. 10, 2012.

FIELD OF THE INVENTION

The present invention refers to an extruder unit for a dryer for biomass, wherein the extruder unit has a surface section with many apertures for the biomass to pass through. The extruder unit comprises a base support that is connected by means of a connecting section to a driving element and can be driven relative to the surface section with the driving element about a rotational axis. The base support comprises at least one support arm having at least one scraper blade which, during the rotation of the base support, follows the shape of the surface section facing the scraper blade. The invention also relates to a dryer for biomass, wherein the dryer has at least one air supply for feeding drying air into the area of the drying surface, and wherein the dryer has at least one extruder unit with which the biomass can be deposited on the drying surface, wherein the drying surface and the extruder unit are mounted movably relative to one another.

BACKGROUND

Corresponding dryers equipped with an extruder unit are known from the state of the art and are generally used for drying pasty biomasses such as (sewage) sludge. To achieve this, the drying surface and extruder unit are movably mounted relative to one another, whereby the relative movement is coordinated in such a way that the biomass is deposited on the drying surface in the shape of a serpentine line and as a continuous strand. An air supply, in turn, is assigned to drying surface used for moving warm and/or dried drying air through the drying surface provided with the corresponding air passages. In this case, the drying air makes contact with the biomass and dries it until it becomes the desired dry matter.

Usually, the extruder unit has a perforated plate with many apertures through which the biomass is pressed through by applying the corresponding excess pressure in order to give it the desired strand shape, whose considerable surface facilitates the drying of the biomass.

Since slurry, in particular, contains—apart from unproblematic fine components—also coarse particles (fibers, hairs, etc.) that could clog or entwine the apertures of the perforated plate, it has proven useful to equip the extruder unit with a blade unit which, in turn, has one or several scraping blades movable relative to the perforated plate with the help of a drive, for shearing off the coarse particles that have accumulated in the apertures.

It has been shown, however, that the known blade units are no longer capable of securing the smooth operation of the extruder unit when the biomass being treated has high solid content (over 30% of dry matter) because coarse particles such as highly dense slurry lumps, which owing to their size do not get caught in the apertures of the perforated plate, are moved by the blade unit along the surface of the perforated plate in the manner of a snowplow. As a result of that, the full opening for the biomass to pass through is no longer available (as the coarse particles cover a part of it) and this ultimately reduces extrusion effectiveness.

SUMMARY

Therefore, a task of this invention is to suggest an extruder unit and a dryer equipped with it that will solve these problems mentioned above. Additional objects and advantages of the invention will be set forth in part in the following description, or may be obvious from the description, or may be learned through practice of the invention.

The task is solved by an extruder unit and a dryer having the characteristics described herein.

According to the invention, the extruder unit comprises a surface section with many apertures that is formed, for example, by a preferably circular perforated plate (the apertures themselves have preferably a circular, oval or cross-shaped cross section). The surface section, in turn, serves to form the above-mentioned strands of the biomass fed through the corresponding supply (for example a pipe or hose). Likewise, at least one scraper blade is provided, fastened to a rotatable base support or that is part of ft. With respect to the surface section, the scraper blade is additionally oriented in such a way that when the base support rotates, it follows the shape of the surface facing the surface area of the surface section). Apart from shearing off or cutting the impurities accumulated in the apertures of the surface section (fibers, hairs, etc.), the scraper blade also has the task of providing the biomass with a kind of predetermined breaking point when it passes the apertures. In other words, when the flow of biomass passes through the apertures, it is cut again and again by the scraper blade(s) and afterwards it immediately joins the fresh flow of biomass once again, thus creating the corresponding sections with lower density or solidity. If the flow of biomass that passed through the apertures (and therefore generally already in the form of individual strands) now falls from a drying surface of a dryer equipped with an extruder unit to a lower lying additional drying surface or on a corresponding collecting container, then the predetermined breaking points cause the individual strands to crumble to individual fragments (so-called pellets). This is extremely advantageous for the further processing (i.e. burning) of the dried biomass, for example. Finally, the base support is driven preferably by a driving element that can have a driving axis, for example, connected to a drive and the base support or one of its connecting pieces.

Ultimately, the scraper blade can be guided on the surface area of the surface section facing the scraper blade (preferably by a rotational movement of the base support) and takes over the function of the above-mentioned blade support known from the state of the art.

The base support may comprise at least one crushing element executed as one single part with the base support or connected to it. The crushing element, which also follows the form of the surface area facing the scraper blade when the base support is rotated, causes the coarse particles held back by the surface section (which would have been pushed by the scraper blade merely along the surface section) to be fragmented without passing through it. To achieve this, the crushing element is provided with an active surface facing the surface section, in which case the gap between active surface and surface section should become smaller against the direction of movement of the base support. In this case, when the coarse particles make contact with the crushing element, they initially reach a place between the above-mentioned active surface and the surface section. Since the gap between active surface and surface section becomes smaller contrary to the direction of movement of the base support and therefore also to that of the crushing element, a kind of clamping of the respective coarse particles takes place and ultimately their fragmentation. In other words, the active surface opposite the surface section should be arranged in front of the surface section in such a way that when the coarse particles make contact with the crushing element, it increasingly presses them against the surface section, fragmenting them in the process. It is worth pointing out that the crushing element not only serves to fragment hard biomass components. Rather, components having a tough, clayey consistency (e.g. slurry components pressed in a (chamber filter) press) are trapped and pressed against or pass through the apertures of the surface section. In other words, the crushing element ensures that all components, which due to their shape and/or consistency are not transported by the scraper blade through the apertures, are captured with the help of the crushing element, sooner or later fragmented, and finally pressed or pushed against the apertures of the surface section.

It is advantageous if the crushing element is executed like a cylinder. The crushing element can be provided, for example, as a roller connected rigidly to the base support and the former is guided along the surface section. The roller can have a middle axis, for example, that extends radially to the exterior starting from the base support. In this case, the roller surface can have the above-mentioned active surface of the crushing element that, which when acting together with the surface section, fragments the large coarse particles of the biomass. The roller can be made of metal or plastic. Furthermore, apart from a cylindrical shape, a conical (stump) shape is also conceivable. The roller can additionally have a smooth or roughened (e.g. rippled) surface to ensure that the corresponding coarse particles are not just moved back and forth by the roller owing to the generated friction but are reliably fragmented by it, it is also extremely advantageous if the crushing element is pivoted on the base support around a rotating axis. Particularly if the crushing element is the roller described above, the friction between roller surface and surface section can be lessened as a result of this (this is advantageous when the crushing element is placed directly on the surface section).

It is additionally advantageous when the rotating axis or a middle axis of the crushing element (possibly mounted torque-proof on the base support) extends parallel to the area of the surface section contiguous to the crushing element. In this case, the gap between crushing element and surface section remains constant over the entire extension of the crushing element. In other words, it is advantageous for the surface section to be present as a flat perforated plate and the crushing element to run perpendicularly to the rotating axis of the base support or perpendicularly to a middle axis of the perforated plate.

It is likewise advantageous if the crushing element has a play perpendicular to the rotational axis so the gap between the crushing element and the surface section contiguous to it can be changed. This can be especially advantageous if the biomass contains hard and angular particles (e.g. pebbles) that tend to jam between a rigid crushing element and the surface section. If the crushing element now has the above-mentioned play, then it can elude the corresponding biomass components and these components can be gradually fragmented, i.e. by repeated contact with the crushing element. Alternately, it is nonetheless also possible to mount the crushing element fully or almost fully without play so it can immediately fragment all coarse biomass particles. In this case, crushing element and surface section should be correspondingly dimensioned to prevent damage to these parts.

It is also extremely advantageous if the scraper blade encloses an angle with the surface section angle having a value between 75° and 105°, preferably a value between 80° and 100° and ideally a value between 85° and 95°, Thus, the scraper blade should run as perpendicularly as possible to it in the area in which it abuts against the surface section. As a result of this, a jamming of coarse particles between the surface section and the scraper blade can be prevented because they would otherwise cause damage to the possibly sharp-edged scraper or blade surface. In this case, the scraper blade serves primarily to shear off the impurities that have accumulated in the apertures of the surface section, which can be textiles, fibers or hair. The fragmentation of coarse particles is finally taken over by the crushing element(s) according to the invention.

It is furthermore advantageous if the base support comprises at least one brush element, which likewise follows the form of the surface area of the surface section facing the scraper blade when the base support rotates. The brush element lies preferably directly on the surface section and extends radially to the exterior from a middle axis of it. As a result of this, it makes contact with the entire surface section when the base support is rotated and induces its cleaning. The brush element is preferably also mounted on a support arm of the base support, in which case the base arm is part of the base support or it can be fastened to it.

It is additionally advantageous if the scraper blade and/or the crushing element and/or the brush element is detachably fastened to the base support to allow an exchange of the above-mentioned parts when they wear out at any time without having to replace the entire extruder unit. The parts could be screwed together to the base support, whereby the corresponding screws can engage either in a thread of the base support or of the respective part. It is likewise conceivable to use the corresponding screw as axis on which finally the respective part can be suspended oscillating around the axis, for example.

In this context, it is extremely advantageous if the scraper blade and/or the brush element are in each case mounted between two contiguous retaining sections of a support arm of the base support. For example, it is conceivable to execute the support arm as a U-shape, in which case the scraper blade or brush element is held between the two arms and the base of the U-shape is formed by the base support or connected (e.g. welded) to it.

It is also advantageous if the support arms extend radially outwards with respect to a longitudinal axis of the driving element. In a top view of the base support, it has therefore several support arms protruding to the exterior and one or several can be equipped with one scraper blade and one or several with one brush element. Likewise, one or several support arms can be present on which the crushing element is attached, in which case—needless to say—it can also be arranged directly on the base support.

As already mentioned, it is finally advantageous if the surface section is executed as perforated plate, which preferably has a circular shape so that the surface can be coated with a scraper blade, brush element and/or crushing element, extending radially to the exterior from a middle axis of the perforated plate.

It is also advantageous if the driving element is executed as a driving axis that preferably penetrates the surface section in the center.

It has additionally proven effective if the surface section is pressed against the scraper blade with the help of a thrust bearing to ensure that the scraper blade always abuts fully against the surface section. To achieve this, it is naturally preferable to position the thrust bearing on the side of the surface section that faces away from the scraper blade and see to it that the perforated plate presses against the scraper blade. The thrust bearing can comprise, for example, a thread-nut combination, whereby a tightening of the screw would increase the pressure on the thrust bearing. Ultimately, the force with which the scraper blade abuts against the surface section can be adjusted with the help of the screw. The increase of the gap between scraper blade and surfaces section caused by wear and tear can therefore be taken into account at any time.

The dryer according to the invention is finally characterized by having one extruder unit with one or several of the characteristics described so far or below (in which case the individual characteristics can be combined in any way with the characteristic of the crushing element according to the invention as far as technically possible).

Here, it is advantageous if the driving element (shaped, for example, like a driving axis) connected to the base support is connected to a drive whose direction of rotation is reversible. In case it is detected that the extruder performance decreases or the surface section described above becomes clogged while the extruder unit is operating, it would in this case be possible to reverse the rotating direction of the drive. This can ultimately allow a part of the extruder unit to unclog or loosen the jammed biomass components, thus reducing even more the danger of a failure of the extruder unit. In other words, it can be advantageous for the dryer to be equipped with a drive (e.g. in the form of an electric motor) that can be driven reversibly so that the rotational direction of the drive can be reversed with the help of a control system. To do this, the control system can be connected to one or several sensors able to detect a blockage of the drive elements, for example. Finally, the blockage can be removed by the corresponding direction reversal of the drive (if necessary, repeated) to ensure as much as possible the maintenance-free operation of the extruder unit of the dryer.

BRIEF DESCRIPTION OF THE DRAWINGS

Further advantages of the invention will be described with reference to the drawings, which show.

DETAILED DESCRIPTION

Figure 1:
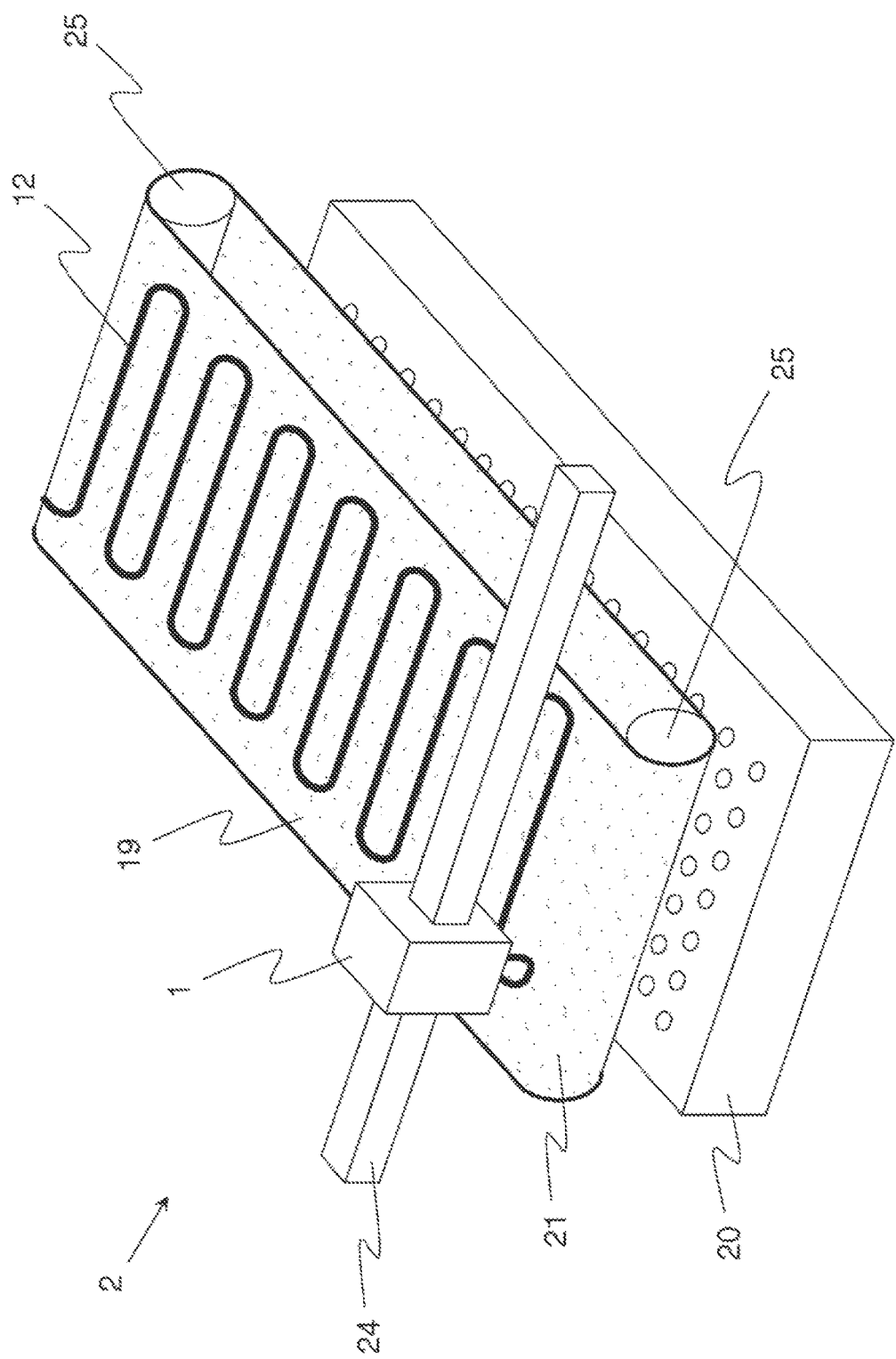
FIG. 1 is a perspective view of a section of a dryer for slurry.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a principle drawing of a dryer 2 for slurry 12 (wherein the slurry 12 has been selected merely as an example of a biomass to be dried and should not be understood in a restrictive way).

The dryer 2 comprises generally a drying surface 19 with many passages 21 (only suggested here) allowing, in turn, the passage of drying air that is brought into the dryer 2, in turn, by an air supply 20 arranged underneath the drying surface 19, for example. In the example shown, the dryer 19 is formed by a drying band that is looped around two shafts 25 and can be driven at least through one of the shafts 25.

In addition, the dryer 2 has an extruder unit 1—movable back and forth along a guiding rail 24 with the help of a drive—used for depositing the biomass to be dried (which is fed to the extruder unit 1 via a hose or pipe not shown) in a controlled way on the drying surface 19. In known dryers, the extruder unit 1 consists as a rule of one perforated plate 16 (cf. FIG. 3) and a blade unit 22 (shown, for example, in FIG. 2) movable relative to the perforated plate 16. To drive the blade unit 22, it can have, for example, a middle bore hole 23 through which it connects torque-proof with a driving axis of a motor unit (not shown). Blade unit 22 and perforated plate 16 are located, in turn, inside a mostly cylindrical delivery section through which the biomass of the extruder unit 1 is fed under a certain excess pressure.

Here, the biomass is pressed against the perforated plate 16, penetrates the holes of the perforated plate 16 and reaches the drying surface 19 in form of biomass strands (see FIG. 1). The course, especially the mutual distance of the individual strands, can be influenced here by the speed of the drying surface 19, the extruder unit 1, and the pressure with which the biomass is pressed through its perforated plate 16.

Figure 2:
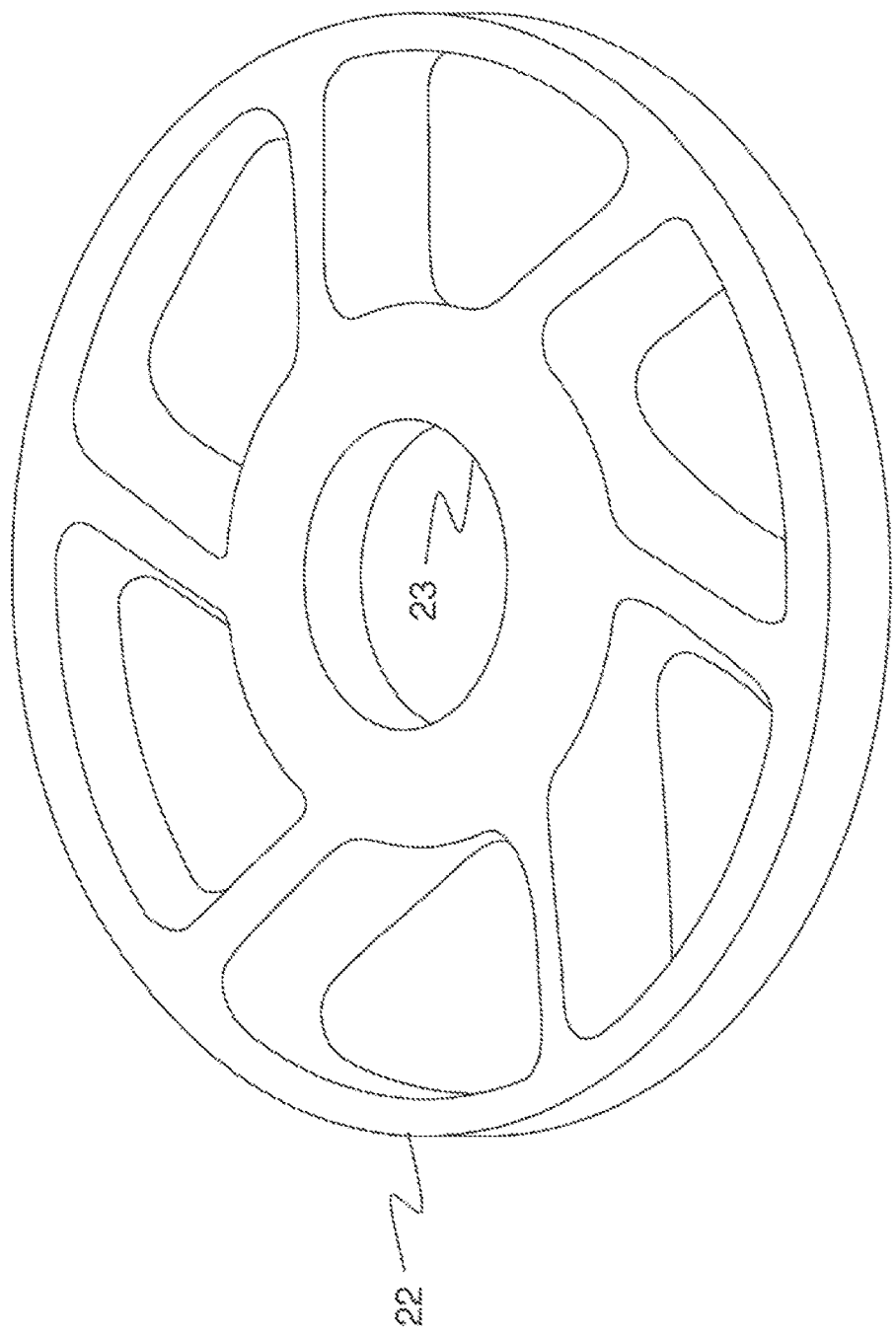
FIG. 2 is a known blade unit of an extruder unit for a dryer according to FIG. 1.

While it is possible to dispense with the use of the blade unit 22 shown in FIG. 2 while the homogenous biomass is processed, it has proven effective in the processing of non-homogenous masses such as slurry 12, in particular. Thus, the individual blade wings of the blade unit 22 that abut against the perforated plate 16 shear off the impurities (build-up caused by hairs, textile fibers, etc.) when there is a relative movement between perforated plate 16 and blade unit 22, thereby maintaining the holes of the perforated plate 16 free.

It has been shown, however, that especially when slurry 12 (e.g. sewage sludge) is processed, the perforated plate 16 becomes dogged over and over. On the one hand, this is caused by build-up not reached by the blade unit 22 or by coarse particles that cannot be reached and fragmented by the blade unit 22. The corresponding coarse particles are present especially in slurry having more than 35% of dry matter, which leads to a significant interference of the drying performance of the dryer 2. The coarse particles are generally strongly grouted slurry components that are led along the perforated plate 16 by the blade unit 22 and they always block a few of its holes while this occurs.

Figure 3:
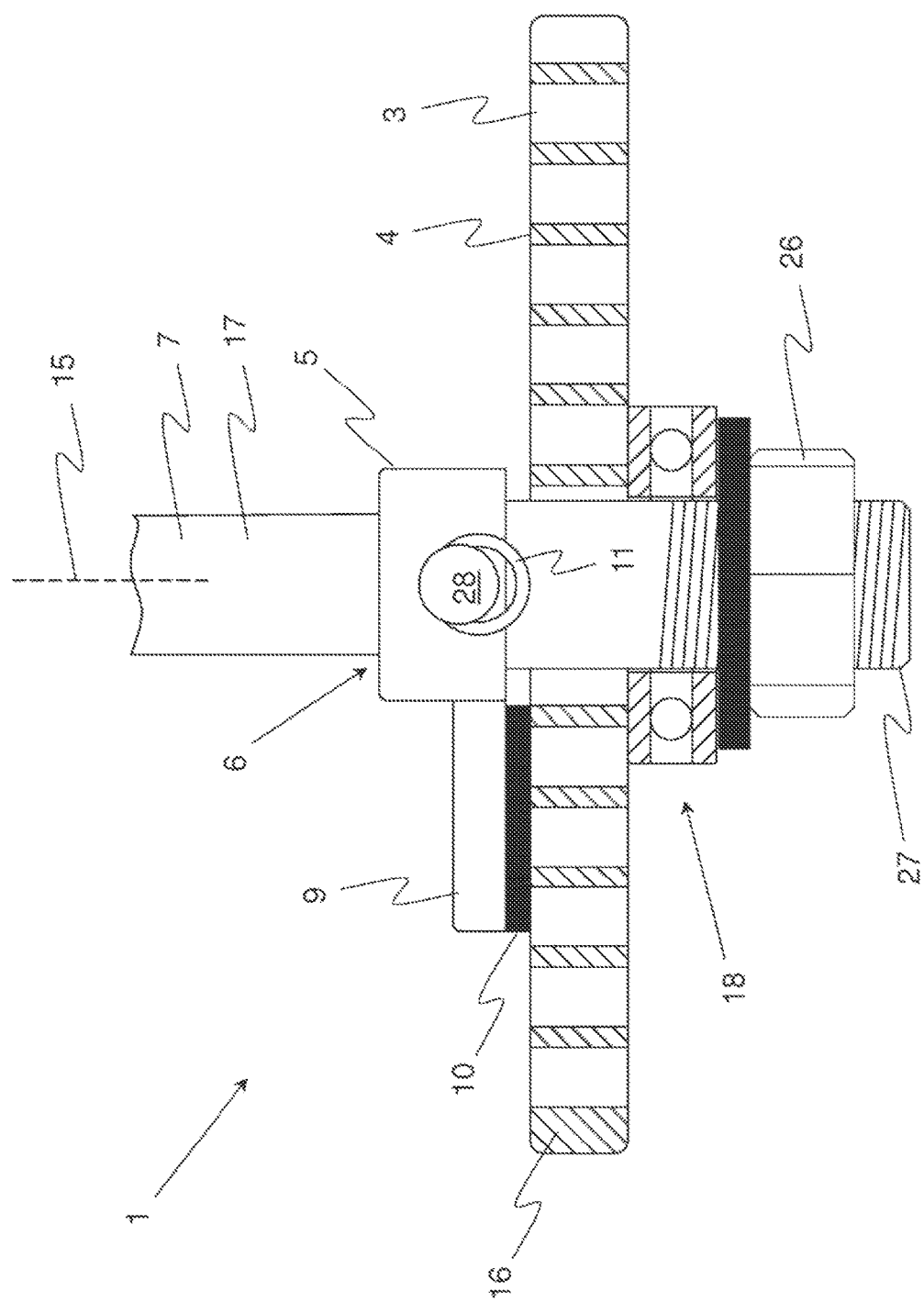
FIG. 3 is a partially cut side view of an extruder unit according to the invention.
Figure 4:
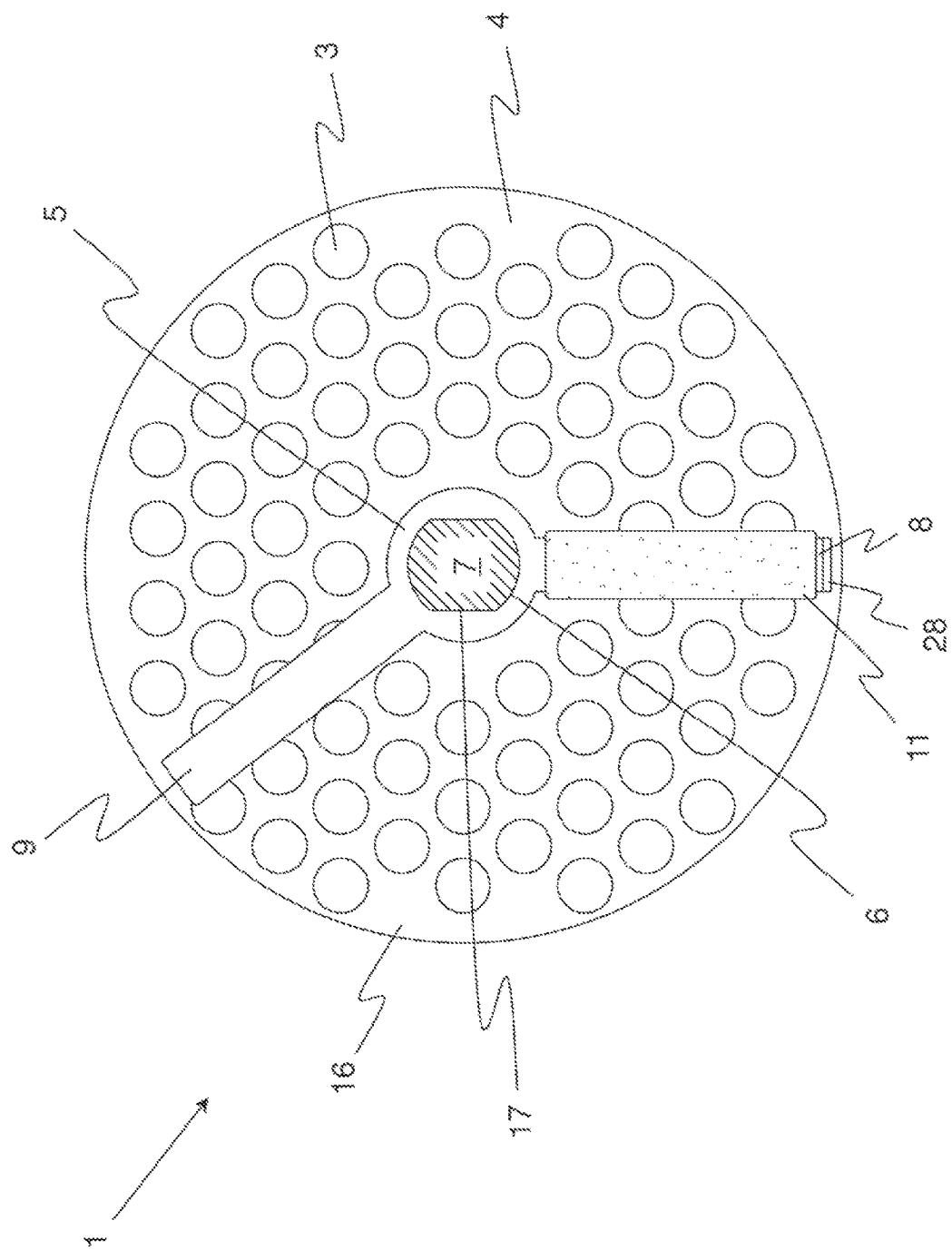
FIG. 4 is a top view of the extruder unit shown in FIG. 3.

Therefore, the extruder unit 1 according to the invention has one or several parts to solve the problem described above. They will be described in detail, initially making reference to FIGS. 3 and 4 (however, the apertures 3 in FIG. 4 are not shown for reasons of clarity).

First of all, the extruder unit 1 has a base support 5 that in the area of a connecting section 6 is connected torque-proof (e.g. via tight fit, see FIG. 4) with a driving element 7 that can be a driving axis 17. The driving element 7, in turn, is connected to a drive (not shown) that can be an electrical motor, allowing the base support 5 to rotate around the longitudinal axis 15 of the driving element 7 and be passed by the biomass relative to a rigidly placed surface section 4 (whereby the surface section 4 has many apertures 3 for the penetration and can be executed as perforated plate 16, for example).

The surface section 4 is surrounded in its circumferential area by a wall (not shown) adapted to the circumference of the surface section 4, so that the biomass coming from above can reach the drying surface 19 through the surface section 4 downward. Additionally, the wall extends all the way above the parts shown in FIG. 3 and ends, for example, in a delivery hose over which the biomass is supplied.

The base support 5, in turn, comprises a scraper blade 10 (shaped, for example, like a metal plate with or without a sharp-edged contact surface for making contact with the surface section 4), which is attached to a support arm 9 of the base support 5 or is a part of it. The support arm 9 can, incidentally, also be executed as one single part with the base support 5 or be attached (e.g. welded) to it.

In addition, the extruder unit 1 comprises a crushing element 11, which follows the shape of the surface area of the surface section 4 facing the scraper blade 10 when the base support 5 is rotated according to the movement of the scraper blade 10. While the scraper blade 10 serves primarily to shear off the partially firmly adhered build-up in the apertures 3 of the surface section 4, the crushing element 11 has the task of fragmenting the coarser biomass particles while it rotates together with the base support 5, thus preventing a blocking of the apertures 3.

The crushing element 11 differs from the scraper blade 10 primarily because it has a counter surface that acts together with the surface section 4 that approaches the surface section 4. In the examples shown in FIGS. 3 to 5, the crushing element 11 has been executed like a roller and can be preferably made to rotate around a rotating axis 8 (needless to say, a torque-proof design is also conceivable). The rotating axis 8 extends preferably parallel to the surface section 4, in which case the crushing element 11 (shaped, for example, like a hollow cylinder) can be held in place on the rotating axis 8 with the help of a front-side anchor point 28. The anchor point 28 can be a flanged part of the rotating axis 8 (cf. FIGS. 3 and 4) or also be a screw placed on the front side that prevents the crushing element 11 to be removed from the rotating axis 8.

While moving along the surface section 4, the crushing element 11 crushes the biomass components that were held back owing to the decreasing distance in movement direction between the surface of the crushing element 11 (in the example of the roller surface shown) and the surface section 4, so that slurry 12 containing over 50% of dry matter can also be processed, for example, without causing the extruder unit 1 to fail.

To prevent a tilting of the biomass components between the crushing element 11 and the area of the surface section 4 contiguous to the apertures 3, the crushing element 11 can have a certain play with respect to the part (e.g. of the rotating axis 8 shown) holding the crushing element 11. The play, however, should be smaller than the diameter of the apertures 3 in order to ensure the desired fragmentation of the coarser biomass components.

Furthermore. FIG. 3 shows a possible way to generate the necessary clamping force between the scraper blade 10 and the surface section 4. Thus, the driving axis 17 has a thread 27 and a nut 26 in the lower area that act together with it. If the nut 26 is tightened, it presses against a thrust bearing 18, thereby pressing the surface section 4 against the scraper blade 10. With the help of this arrangement, it is possible to readjust the clamping force of the scraper blade 10 (for example, depending on the inevitable wear and tear) at any time without having to disassemble the individual parts.

Figure 5:
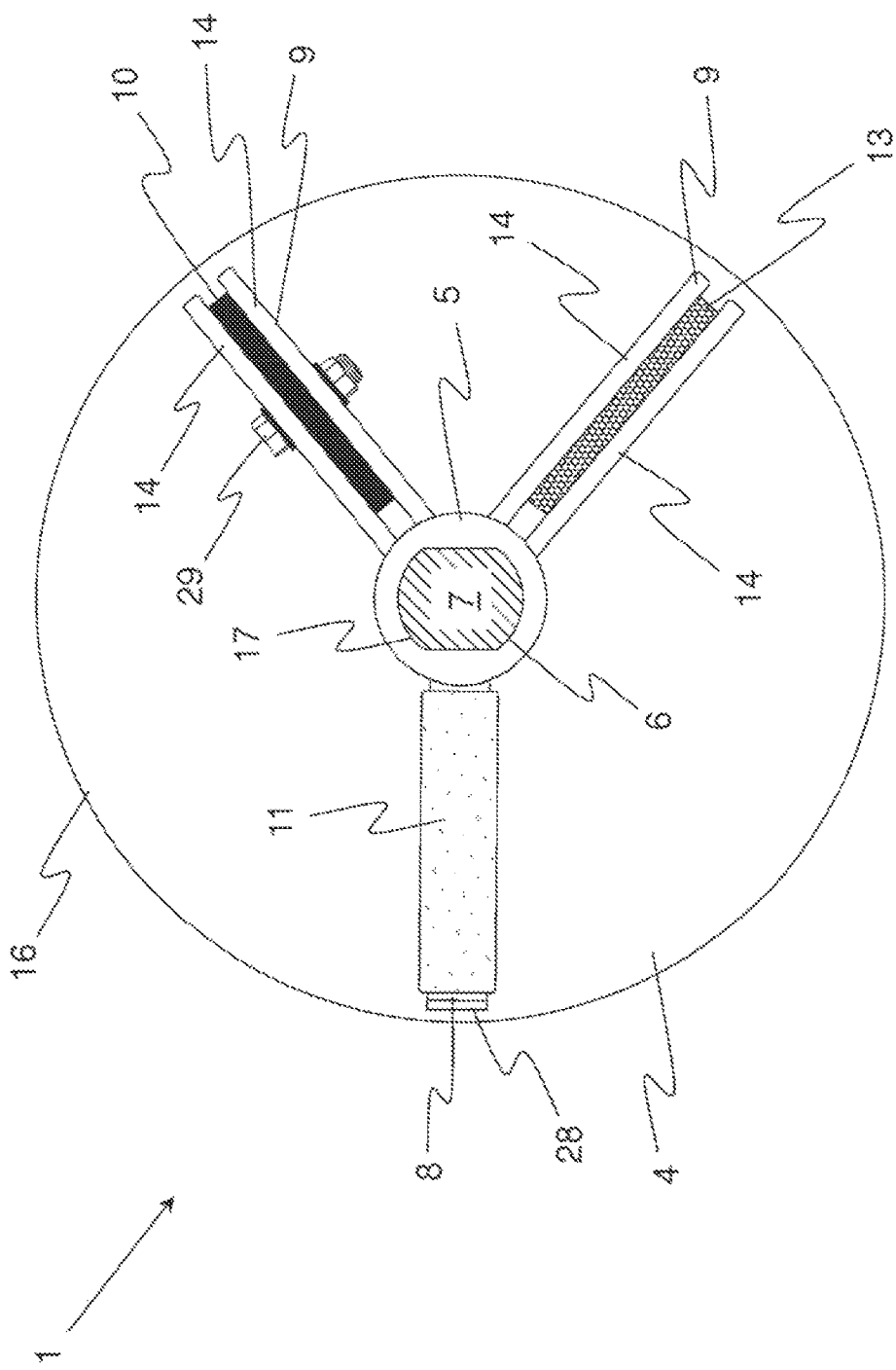
FIG. 5 is a top view of an alternative extruder unit.

Finally, FIG. 5 shows two other further embodiments of the invention. Thus, it could be conceivable, for example, to fix the scraper blade 10 in place around a pivot bearing 29 (a thread connection engaging in a slotted hole of the scraper blade 10 or of the support arm 9, for example) on the support arm 5 or a corresponding support arm 9. Height differences or different slopes of the surface section 4 can be effectively compensated as a result of it.

In this context, it can likewise be advantageous to form the support arm 9 by two contiguous retaining sections 14 and the scraper blade 10 is held between them.

Finally, the extruder unit 1 can have, in addition to the scraper blade(s) 10 or the crushing element(s) 11 or one or several brush elements 13. The brush element 13 shown exemplarily in FIG. 5 should, in turn, abut against the surface section 4 (compare the position of the scraper blade 10 in FIG. 3) and finally allow the fragmentation of build-up or other fibrous impurities or those not otherwise reached by the scraper blade 10 that are already partially in the apertures 3 of the surface section 4 by pulling them out of it so they can pass the surface section 4 in another place (in an additional run, so to say) or be fragmented by the scraper blade 10 (which can be executed in the form of a blade).

The present invention is not limited to the embodiment shown and described. Modifications as part of the patent claims are just as possible as a combination of the characteristics, even if they are shown and described in different embodiments.

The invention claimed is:

1. An extruder unit for a dryer for biomass, comprising:
   a surface section having a plurality of apertures defined through for the biomass to pass through the surface section;
   a base support connected to a driving element, wherein the base support is driven by the driving element about a rotational axis relative to the surface section;
   a support arm connected to the base support, and a scraper blade configured on the support arm and against the surface section such that during a rotation of the base support, the scraper blade follows a surface area shape of the surface section over which the scraper blade moves;
   a crushing element configured on the base support and against the surface section so as to rotate with the base support and follow the surface area shape of the surface section over which the crushing element moves to crush biomass components held on the surface section; and
   wherein the driving element has a driving axis that penetrates the surface section, and wherein the surface section is pressed against the scraper blade by way of a thrust bearing positioned on a side of the surface section facing away from the scraper blade.

2. The extruder unit according to claim 1, wherein the crushing element comprises a hollow cylinder disposed against the surface section.

3. The extruder unit according to claim 2, wherein the crushing element is rotatable on the base support about a rotating axis.

4. The extruder unit according to claim 3, wherein the rotating axis extends from the base support parallel to the surface section.

5. The extruder unit according to claim 3, wherein the crushing element has a play perpendicular to the rotating axis so that a gap between the crushing element and the surface section can be changed.

6. The extruder unit according to claim 1, wherein the scraper blade encloses with the surface section an angle having a value between 75° and 105°.

7. The extruder unit according to claim 1, further comprising a brush element configured on the base support and against the surface section so as to rotate with the base support and follow the surface area shape of the surface section over which the brush element moves to clean the surface section.

8. The extruder unit according to claim 7, wherein one or more of the scraper blade, the crushing element, and the brush element are detachably attached to the base support.

9. The extruder unit according to claim 7, wherein the scraper blade and the brush element are each mounted between two contiguous retaining sections of the support arm.

10. The extruder unit according to claim 9, wherein the two contiguous retaining sections extend radially from the base support relative to a longitudinal axis of the driving element.

11. The extruder unit according to claim 1, wherein the surface section comprises a perforated plate.

12. A dryer for biomass, comprising:
a drying surface with air passages defined therethrough;
an aft supply configured to supply drying air through the drying surface;
an extruder unit for depositing the biomass on the drying surface, the extruder unit further comprising:
a surface section having a plurality of apertures defined through for the biomass to pass through the surface section;
a base support connected to a driving element, wherein the base support is driven by the driving element about a rotational axis relative to the surface section;
a support arm connected to the base support, and a scraper blade configured on the support arm and against the surface section such that during a rotation of the base support, the scraper blade follows a surface area shape of the surface section over which the scraper blade moves; and
a crushing element configured on the base support and against the surface section so as to rotate with the base support and follow the surface area shape of the surface section over which the crushing element moves to crush biomass components held on the surface section; and
wherein the driving element has a driving axis that penetrates the surface section, and wherein the surface section is pressed against the scraper blade by way of a thrust bearing positioned on a side of the surface section facing away from the scraper blade.

* * * * *

UNITED STATES PATENT AND TRADEMARK OFFICE
CERTIFICATE OF CORRECTION

PATENT NO. : 9,827,704 B2
APPLICATION NO. : 14/427161
DATED : November 28, 2017
INVENTOR(S) : Sven Penkwitt and Karl-Heinz Bechtl It is certified that error appears in the above-identified patent and that said Letters Patent is hereby corrected as shown below:

In the Specification

Column 6, Line 47 reads "becomes dogged over and over. On the one hand, this is" should read --becomes clogged over and over. On the one hand, this is--

In the Claims

Column 9, Claim 12, Line 26 reads "an aft supply configured to supply drying air through the" should read --an air supply configured to supply drying air through the--

Signed and Sealed this
First Day of May, 2018

Andrei Iancu
*Director of the United States Patent and Trademark Office*